May 21, 1940.   L. O. E. ROESSEL   2,201,632
ANTISKIDDING DEVICE FOR AUTOMOBILES
Filed Sept. 15, 1937   2 Sheets-Sheet 1
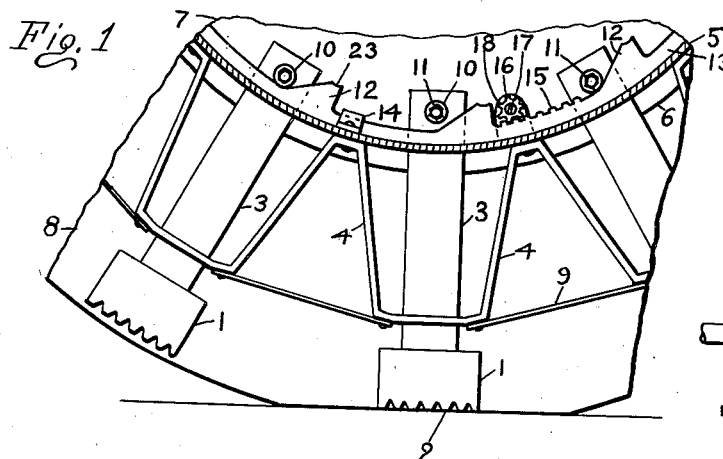
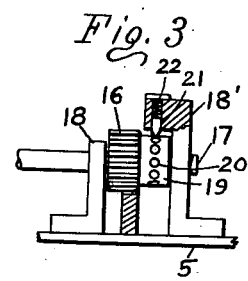
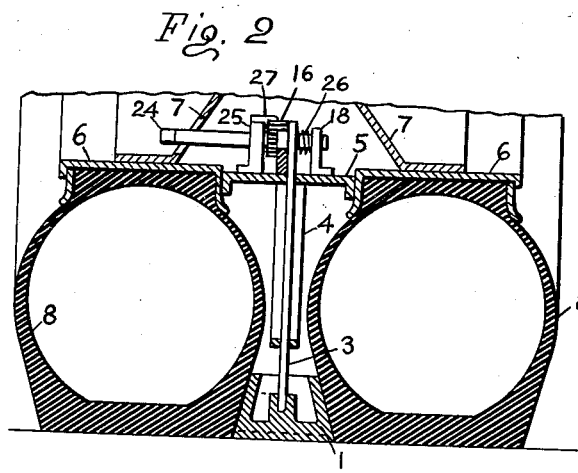
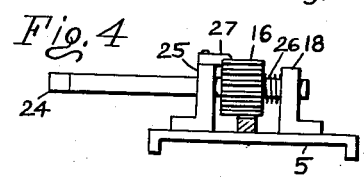
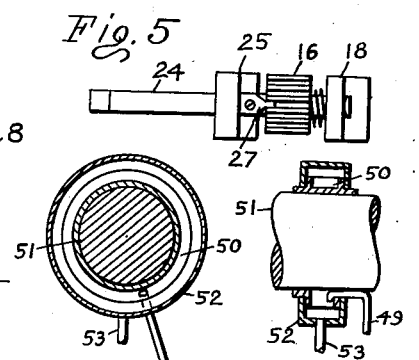
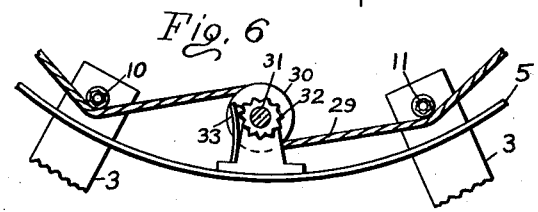
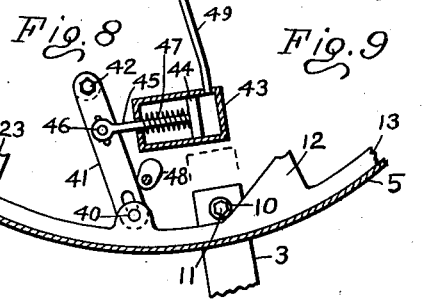
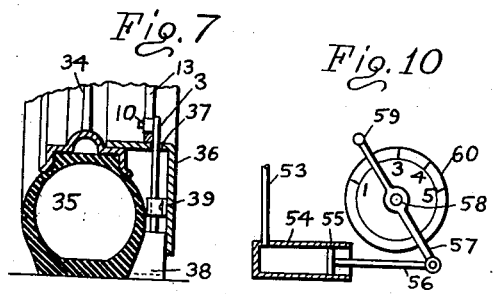
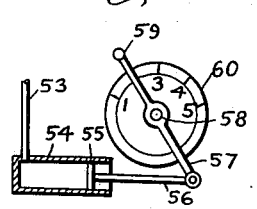
LOUIS OTTO E. ROESSEL
INVENTOR
BY
ATTORNEY May 21, 1940.        L. O. E. ROESSEL        2,201,632
ANTISKIDDING DEVICE FOR AUTOMOBILES
Filed Sept. 15, 1937        2 Sheets-Sheet 2
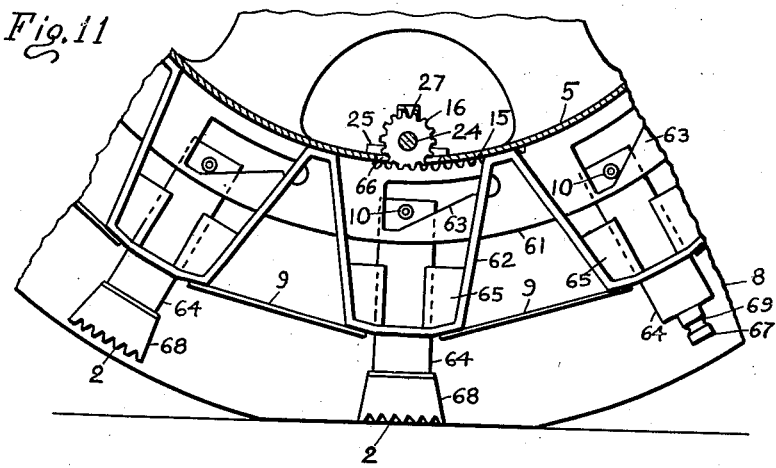
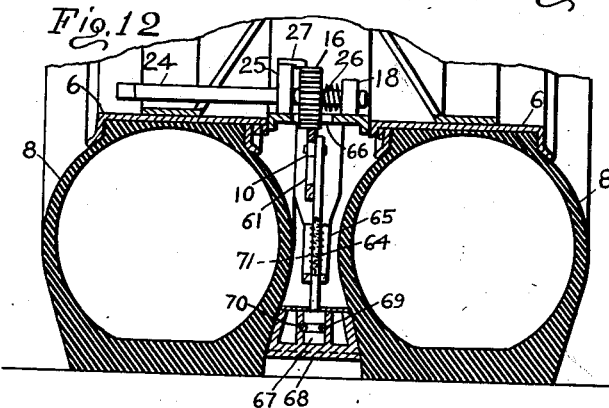
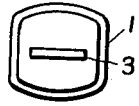
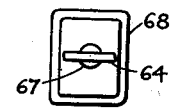
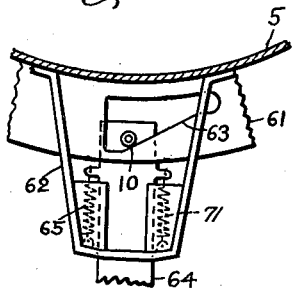
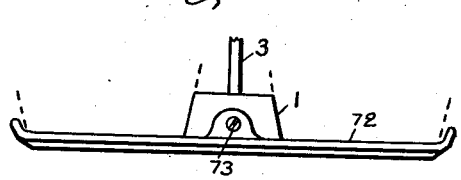
Louis Otto E. Roessel
INVENTOR
BY John P. Nixonow
ATTORNEY Patented May 21, 1940

2,201,632

UNITED STATES PATENT OFFICE 2,201,632

ANTISKIDDING DEVICE FOR AUTOMOBILES

Louis Otto E. Roessel, Chappaqua, N. Y., assignor of forty per cent to Elmon C. Gillette, New York, N. Y.

Application September 15, 1937, Serial No. 163,884

14 Claims. (Cl. 152—216)

My invention relates to antiskidding devices for automobiles and has particular reference to devices for increasing traction of rubber tires.

My invention has for its object to provide an attachment for wheels of automobiles or other automotive vehicles, including trailers, etc., comprising metal shoes adapted to grip the surface of the road thereby increasing traction and preventing skidding. I mount the shoes on plungers and provide supporting means which allows the plungers to slide in radial direction thereby causing the shoes to follow the deflection of the tires. I also provide means to positively limit the outward movement of the plungers of the shoes so as to prevent them from extending beyond the periphery of the tires. This is important in order to cause the shoes to come in contact with the surface of the road only when the tire becomes deflected or compressed at the point of contact with the road, thereby preventing the shoes from striking the ground ahead of the tires so as to eliminate the possible clattering noise during operation of my device.

Another object of my invention is to provide means for adjusting or regulating the limiting outward position of the shoes, this adjustment being made simultaneously for all the shoes on a wheel. For this purpose I provide a movable cam-ring supported at the wheel, the cams of the ring engaging the inner ends of the plungers so as to limit their outward movement but leaving them free to move inwardly. I also provide means to manually turn the cam-ring for simultaneous adjustment of the plungers. For this purpose I provide a manually rotatable gear in mesh with a rack or gear teeth on the cam-ring.

As a modification I provide a flexible cable or chain engaging suitable rollers on the inner ends of the plungers and connected with a device for drawing the ends of the cable together when it is desired to move the plungers inwardly so as to bring the shoes into their inoperative position.

The antiskidding shoes in my device have tapering sides engaging the tapering sides of the tires, the shoes being placed between the two tires of a dual wheel in such manner that the shoes are prevented from moving inwardly by the tires and can move only when the tires themselves are deflected.

Another object of my invention is to provide means to support my tapering antiskidding shoes at the sides of single tires of automobiles or light trucks. For this purpose I provide a ring at the side of the tire, the shoe being wedged between the ring and the side of the tire.

Another object of my invention is to provide means to lock the plunger adjusting device in any desired position so as to positively adjust the extreme distance of the shoes from the center of the wheel. For this purpose I provide ratchet wheels with pawls for the gear operating the cam-ring.

Still another object of my invention is to provide means for controlling the adjustment of the shoes from a dashboard of an automotive vehicle. For this purpose I provide a piston in a cylinder, the piston being operatively connected with the cam-ring for turning the same when a fluid under pressure is introduced into the cylinder. I also provide means to manually pump the fluid into the cylinder for operating the latter, the manual means having several operating positions for adjusting the position of the cam-ring for different degrees of radial adjustment of the shoes.

My invention is more fully described in the accompanying specification and drawings in which—

Fig. 1 is a fractional elevational view of my antiskidding attachment.

Fig. 2 is a sectional view of the same.

Fig. 3 is a detail view of an adjusting mechanism.

Fig. 4 is a detail view of a modified adjusting mechanism.

Fig. 5 is another view of a modified adjusting mechanism.

Fig. 6 is a fractional view of a modified attachment.

Fig. 7 is a sectional view of an attachment for a single wheel.

Figs. 8, 9 and 10 are diagrammatic detail views of a remote control mechanism for the antiskidding attachment.

Fig. 11 is a fractional elevational view of a modified antiskidding attachment for dual wheels.

Fig. 12 is a sectional view of the same.

Fig. 13 is a detail view of a plunger with springs.

Fig. 14 is a detail view of a supplementary antiskidding shoe.

Fig. 15 is a top plan view of a shoe for a mechanism of Figs. 1 and 2.

Fig. 16 is a top plan view of a shoe for a mechanism of Figs. 11 and 12.

My antiskidding device consists of antiskidding shoes 1 preferably made of cast steel or chilled cast iron and provided with sharp ribs 2 on their outer surfaces which come in contact with the surface of the road. The shoes are attached, by welding or otherwise, to the ends of plunger bars 3. The latter are supported in a substantially radial direction by being slidably fitted in corresponding slots in braces 4 extending to a spacer ring 5 to which the braces are riveted or welded. The spacer ring is fitted between rims 6 of dual wheels 7 having pneumatic tires 8.

The spacer ring is preferably retained in its place by being wedged between the respective rims. It also has slots for the inner ends of the plunger bars 3 so that the latter are guided in their radial sliding movement by the slots in the braces and in the ring. The braces are bent in a zig-zag shape extending outward to a distance from the shoes sufficient to allow the latter to be withdrawn from contact with the surface of the road. The braces are stiffened by tangential braces 9. The inner ends of the plunger bars 3 have rollers 10 fastened by bolts 11 on which the rollers can rotate. They are engaged by cam portions 12 of a cam-ring 13 slidably abutting the inside surface of the spacer ring 5 and guided by brackets 14 fastened to the spacer ring. The cam ring has gear teeth 15 in one place engaged by a gear 16 on a shaft 17 journaled in bearing brackets 18 supported on the spacer ring. The end of the shaft 17 extends through a corresponding hole in the front wheel and has a square-shaped end to be turned by a suitable wrench. The shaft 17 has also a cylinder 19 with notches 20 engaged by latch or plunger 21 sliding in a hole in a bracket 18' under pressure of a spring 22. The plunger 21 frictionally locks the cylinder against rotation, permitting, however, to manually turn it by the wrench applied to the end of the shaft 17. This mechanism serves to lock the cam-ring in any desired position for accurate adjustment of the position of the shoes with reference to the periphery of the tires, between the low points of the cams when the shoes fully extend for an operative contact with the surface of the road, and the high points having recesses 23 for the rollers 10, corresponding to the inoperative position of the shoes when they are fully withdrawn from contact with the road.

The operation of my device is as follows.

Before starting on a trip, a driver of the vehicle adjusts the shoes to a desired position in relation to the periphery of the tires, by turning the shaft 17 and thereby rotating the cam-ring 13. Thus in a dry weather, when the antiskidding shoes are not needed, the shaft 17 is turned so as to move the cams 12 fully under the rollers 10 thereby moving the plunger bars 3 with the shoes radially inwardly into the inoperative position. The shoe, when pulled inwardly, forces the tire walls out, acting as a wedge between them because of its tapered shape. The wall of the tires being also tapering, it follows that the tires, because of their resiliency, will tend to push the tapering shoes outward in all positions of the shoes. In this position the shoes do not touch the road at all under ordinary conditions of the tire depression or deflection. If, however, the road is slippery, has ice, snow, sleet, loose sand, oil, etc., the shaft 17 is turned so as to bring the shoes into an operative position in which the shoes come in contact with the surface of the road as soon as the tire begins to be depressed by the weight of the vehicle as shown in Fig. 1. The position of the shoes is so adjusted that they do not reach the periphery of the tires as shown at the left in Fig. 1 and become operative only when the tire is depressed. The tire therefore comes first in contact with the road, the shoes contacting the road only after the tire becomes slightly depressed, so that the shoes with this arrangement cannot produce any clattering noise against the pavement and cannot damage the latter. The shoes at the same time exert a full gripping action on the pavement, they being spaced so that one of the shoes always grips the road, an advancing shoe coming in contact before the preceding shoe leaves the road. My experiments have shown that such shoes afford a practically 100% traction under the worst possible road surface conditions, including ice, sleet, oil, etc. They also provide traction on a soft, muddy or sandy ground, and also in a deep snow.

A modified construction of the locking mechanism is shown in Figs. 4, 5 and 2. A shaft 24 is rotatively and slidably mounted in brackets 18 and 25. A spring 26 tends to push the shaft with the gear 16 against the bracket 25 which has a locking dog 27 which enters between the teeth of the gear 16 thereby preventing it from rotation. By pushing the shaft back against the spring 26 by a wrench placed on the square end 28 of the shaft, the gear 16 is released from the dog 27 so that the shaft and the gear can be rotated for adjusting the position of the cam-ring. The spring 26 pushes the shaft back and locks the gear 16 against the dog 27 when the pressure on the wrench is released.

Another modification is shown in Fig. 6. The rollers 10 are engaged by a flexible cable or chain 29 whose ends are wound on a drum 30 on a shaft 31. A ratchet wheel 32 is also mounted on the shaft and is engaged by a resilient dog 33 which locks the wheel in any position in which it is turned. By turning the drum to the right as shown in Fig. 6, the cable 29 is shortened thereby drawing the plunger bars inwardly and placing the shoes farther away from the periphery of the tires.

My device can be also used with a single wheel 34 and a single tire 35 as shown in Fig. 7. An auxiliary disc 36 is supported by its flange 37 at the side of the tire at a distance therefrom so as to leave room for shoes 38. The latter have one side tapering, which fits against the side of the tire, the other side, fitting against the disk 36, is flat or straight. The bar plungers 3 are guided by brackets or clips 39 attached to the disc 36. The position of the shoes in this case is adjusted in the same manner as with the other constructions described, the shoe being wedged between the side of the tire and the disc 36.

Another modification is shown in Figs. 8, 9 and 10 illustrating a remote control arrangement for changing the adjustment of the antiskidding shoes from a driver's seat. The cam-ring 13 in this case is pivotally connected at 40 to one end of a lever 41 the other end of which is pivoted at 42 to the wheel 7. A cylinder 43 is mounted on the wheel near the lever 41. A piston 44 slides in the cylinder and has a rod 45 pivotally connected at 46 to a middle point on the lever 41. A retrieving spring 47 tends to move the piston into the cylinder in which position the shoes are moved out into the operative position at the periphery of the tires. A manually operable cam 48 limits the outward movement of the cam-ring and the position of the shoes in the operative position. The piston is connected by a pipe 49 with an inner hollow ring 50 fitted on the axle 51 of the wheel. A stationary hollow ring 52 encloses the rotating ring 50 and is connected by a pipe 53 with a control cylinder 54 supported on a dashboard of the vehicle. It has a piston 55 with a rod 56 the other end of which is connected to one end of a handle 57 rotatively supported at 58. The other end of the handle 57 is provided with a knob 59 for manually turning the handle into positions 1, 2, 3, 4 and 5 on a dial 60. The dial has depressions or notches at these positions for resiliently or yieldingly retaining the handle in these positions. A suitable fluid fills the cylinders and the pipes, controlling the position of the piston 44 in accordance with the position of the piston 55. With this arrangement the driver can instantly bring the antiskidding shoes in contact with the road if a bad surface is encountered, retracting the shoes again when the bad surface is passed.

A modified arrangement is shown in Figs. 11 and 12 especially suitable for wheels having insufficient room for the cam ring on the inside of the spacer ring. The cam-ring 61 is slidably mounted on the outer side of the spacer ring 5 and fits in corresponding slots in the sides of braces 62 similar to the braces 4 but made wider so as to provide room for the slots. The ring 61 has inner cam portions 63 engaging rollers 10 on the inner ends of plunger bars 64. The latter slide in corresponding slots in the outer portions of the braces 62 and between guiding blocks 65 welded to the inner sides of the braces. The cam ring has gear teeth in the inner edge in mesh with a gear 16 passing through a slot 66 in the spacer 5. The slot 66 is wider than the gear so as to allow the latter to be moved axially against the spring 26 for disengaging the gear from the locking dog 27. The operation of this mechanism is similar to the operation of the device shown in Figs. 1 and 2 except that the plunger bars 64 have cylindrical swivels 67 rotatively fitted in corresponding holes in shoes 68 so that the shoes can be turned at right angles when the plunger bars are moved into their extreme outward position so as to be placed by their narrow sides against the tires. The shoes in this position can be easily drawn deeply between the tires into the inoperative position in which they cannot touch the surface of the road. The cylindrical swivel portions 67 have annular grooves 69 for pins 70 which retain the cylinders 67 in engagement with the shoes, preventing the latter to be removed from the plunger bars. If desired, however, the swivel shoes can be also drawn inwardly between the tires into the inoperative position as shown in Fig. 2. The shoes, even when drawn tightly against the tires, cannot have any injurious effect for the latter since there is no relative motion between the shoes and the tires in this case.

The force required for turning the shaft 24 for withdrawal of the shoes into the inoperative position is not excessive even for very large tires pumped to 90 lbs. pressure per square inch. Assuming 15° angle of the sides of the tires, 30° angle of the cams, 3 in. diameter of the gear 16 and 10 in. handle of the wrench, the force applied to the handle will be only about 10 or 12 lbs. taking into consideration friction against the tire and at the cam.

Supplementary springs 71, Fig. 13, may be used in certain cases in order to prevent a rattle of the parts when there is insufficient tension applied to the plunger bars by the cams.

Supplementary shoes 72 may be attached to the shoes 1 by bolts 73 for providing additional traction for traveling over soft and muddy road, as for instance, may be required for military vehicles.

The shoes 1 may be rounded off at the sides facing the tires as shown in Fig. 15 in order to facilitate the withdrawal of the shoes into the inoperative position. The swivel type shoes are preferably made of a rectangular section in order to prevent their spontaneous turning in service.

I claim as my invention:

1. An antiskidding device for automobiles comprising a plurality of antiskidding shoes, means to support the shoes at the side of a tire of a wheel of an automobile, the shoes having tapering sides engaging the sides of the tire near its periphery and being thereby adapted to be yieldably pushed outward, the shoes being adapted to move inwardly when the tire is depressed, and a rigid means to limit the outward movement of the shoes.

2. An antiskidding device for automobiles comprising a plurality of antiskidding shoes, means to support the shoes at the side of a tire of a wheel of an automobile, the shoes having tapering sides engaging the sides of the tire near its periphery and being thereby adapted to be yieldably pushed outward, the shoes being adapted to move inwardly when corresponding portions of the tire are depressed, a rigid means to limit the outward movement of the shoes, and a manually operable means to adjust the limiting means.

3. An antiskidding device for automobiles, comprising a plurality of antiskidding shoes, means to support the shoes at the side of a tire of a wheel of an automobile, the shoes having tapering sides engaging the sides of the tire near its periphery and being thereby adapted to be yieldably pushed outward, the shoes being adapted to move inwardly when corresponding portions of the tire are depressed, a positive means to limit the outward movement of the shoes, means to manually adjust the limiting means, and means to lock the adjusting means in a desired position.

4. An antiskidding device for automobiles comprising a plurality of antiskidding shoes, means to support the shoes at the side of a tire of a wheel of an automobile, the shoes being larger at their outer portions so as to engage the tapering side of the tire and being thereby adapted to be yieldably pushed outward, the shoes being adapted to move inwardly when corresponding portions of the tire are depressed, means to limit the outward movement of the shoes, and means to manually adjust the limiting means between the operative and inoperative positions of the shoes, the shoes in the inoperative position being drawn inwardly against the pressure of the side of the tire and out of contact with the surface of the road.

5. An antiskidding device for automobiles comprising a plurality of antiskidding shoes, means to support the shoes at the side of a tire of an automobile, the outer portions of the shoes being shaped to engage the tapering side of the tire near its periphery and being thereby adapted to be yieldably pushed outward, the shoes being adapted to move inwardly when corresponding portions of the tire are depressed, means to limit the outward movements of the shoes, means to move the limiting means between the extreme outer operative and the inner inoperative positions of the shoes, the limiting means being adapted to simultaneously engage all the shoes of the wheel, the shoes in the inoperative position being drawn inwardly against the yielding pressure of the side of the tire.

6. An antiskidding device for automobiles comprising a plurality of antiskidding shoes, plunger bars extending inwardly from the shoes, means to slidably support the bars, the shoes being shaped to engage the tapering outer sides of the tire and being thereby adapted to be yieldably pushed outward by the sides of the tires, and further adapted to move with the corresponding portions of the tire when the latter is depressed, projections on the inner ends of the bars, a cam-ring rotatively supported at the side of the tire, the cams of the ring engaging the projections, so as to limit the outward movement of the bars with the shoes, and means to rotate the cam-ring for adjusting the outer position of the shoes.

7. An antiskidding device for automobiles comprising a plurality of antiskidding shoes, means to support the shoes between tires of a dual wheel of an automotive vehicle, the shoes being shaped so as to be wedged between the outer tapering portions of the tires and being thereby adapted to be yieldably pushed outward by the sides of the tires, and further adapted to move inwardly with the corresponding portions of the tires when the latter are depressed, and positive means to limit the outward movement of the shoes.

8. An antiskidding device for automobiles comprising a plurality of antiskidding shoes, means to support the shoes between tires of a dual wheel of an automotive vehicle, the shoes being shaped so as to be wedged between the outer tapering sides of the tires and being thereby adapted to be yieldably pushed outward by the sides of the tires, and further adapted to move inwardly with the corresponding portions of the tires when the latter are depressed, means to limit the outward movement of the shoes, and means to adjust the limiting means for the operative and inoperative positions of the shoes.

9. An antiskidding device for automobiles comprising a plurality of antiskidding shoes, the sides of the shoes being tapered to conform to the taper of the outer side of a tire of a wheel of an automobile, an annular member supported on the wheel at the side of the tire, the shoes being wedged between the annular member and the tire, the shoes being thereby adapted to be yieldably pushed outward by the sides of the tires, and further adapted to move inwardly with the corresponding portions of the tire when the latter is depressed, means to limit the outward movement of the shoes, and means to adjust the limiting means for different radial positions of the shoes.

10. An antiskidding device for automobiles comprising a plurality of antiskidding shoes, the sides of the shoes being shaped to engage the sides of the tires of a dual wheel of an automobile and being thereby adapted to be yieldably pushed outward, plunger bars rotatively fitted in the shoes and extending inwardly between the tires, means to slidably support the plunger bars, projections on the inner ends of the bars, a cam-ring movably supported on the wheel, the cams of the ring engaging the inner ends of the plunger bars, and means to rotate the cam ring thereby moving the shoes between their operative and inoperative positions.

11. An antiskidding device for automobiles comprising a plurality of antiskidding shoes, means to support the shoes at the side of a tire of a wheel of an automobile, the shoes having tapering sides engaging the sides of the tire near its periphery, and being adapted to be yieldably pushed outward, the shoes being adapted to move inwardly when corresponding portions of the tire are depressed, a rigid means to limit the outward movement of the shoes, a fluid operated motor connected with the limiting means, means to admit the fluid to the motor, and means to control the fluid admitting means for different operative positions of the limiting means.

12. An antiskidding device for automobiles comprising a plurality of antiskidding shoes, means to support the shoes at the side of a tire of a wheel of an automobile, the shoes having tapering sides engaging the sides of the tire near its periphery, and being adapted to be yieldably pushed outward, the shoes being adapted to move inwardly when corresponding portions of the tire are depressed, a rigid means to limit the outward movement of the shoes, a motor operatively connected with the limiting means, a source of power for the motor, a controller for the motor mounted within reach of the vehicle operator and having a plurality of positions, and means to limit the movement of the motor so as to bring the limiting means into a predetermined position for each position of the controller.

13. An antiskidding device for automobiles comprising a plurality of antiskidding shoes, means to support the shoes at the side of a tire of a wheel of an automobile, the shoes having tapering sides engaging the sides of the tire near its periphery, and being adapted to be yieldably pushed outward, the shoes being adapted to move inwardly when corresponding portions of the tire are depressed, a rigid means to limit the outward movement of the shoes, a fluid operated motor connected with the limiting means and comprising a cylinder and a piston, a control cylinder with a piston within reach of the vehicle operator, the control piston being adapted to be manually operated, and a pipe connecting the two cylinders, the motor cylinder being adapted to be moved into definite positions for adjusting the shoes to predetermined operative positions by placing the control piston into predetermined positions.

14. An antiskidding device for automobiles comprising a plurality of antiskidding shoes, plunger bars extending inwardly from the shoes, means to slidably support the bars, the shoes being shaped to engage the tapering outer sides of the tire and being thereby adapted to move the corresponding portions of the tire when depressed, projections on the inner ends of the bars, a cam-ring rotatively supported at the side of the tire, the cams of the ring engaging the projections, so as to limit the outward movement of the bars with the shoes, a fluid operated motor connected with the cam-ring and comprising a cylinder and a piston, means to admit fluid into the cylinder, and means to control the amount of fluid admitted into the cylinder for different positions of its piston thereby placing the cam-ring in different operative positions for different positions of the shoes.

LOUIS OTTO E. ROESSEL.